United States Patent
Ball

(10) Patent No.: US 10,942,493 B2
(45) Date of Patent: Mar. 9, 2021

(54) FLUID MONITORING SYSTEM AND METHOD

(71) Applicant: Lowell Ball, Indian Harbour Beach, FL (US)

(72) Inventor: Lowell Ball, Indian Harbour Beach, FL (US)

(73) Assignee: Lowell Ball, Indian Barbour Beach, FL (US)

( * ) Notice: Subject to any disclaimer, the term of this patent is extended or adjusted under 35 U.S.C. 154(b) by 281 days.

(21) Appl. No.: 15/399,480

(22) Filed: Jan. 5, 2017

(65) Prior Publication Data

US 2017/0329353 A1 Nov. 16, 2017

Related U.S. Application Data

(60) Provisional application No. 62/336,810, filed on May 16, 2016.

(51) Int. Cl.
*G05B 13/04* (2006.01)
*G01M 3/32* (2006.01)

(52) U.S. Cl.
CPC ........... *G05B 13/04* (2013.01); *G01M 3/3236* (2013.01)

(58) Field of Classification Search
CPC ........ G05D 7/06; G05B 13/04; G01M 3/3236
See application file for complete search history.

(56) References Cited

U.S. PATENT DOCUMENTS

| | | | |
|---|---|---|---|
| 9,776,888 B1* | 10/2017 | Kurani | ................... C02F 1/008 |
| 2008/0106422 A1 | 5/2008 | Sparks et al. | |
| 2008/0311898 A1 | 12/2008 | Benco et al. | |
| 2010/0187185 A1 | 7/2010 | Johnson et al. | |
| 2012/0158335 A1 | 6/2012 | Duchamp et al. | |
| 2013/0206660 A1 | 8/2013 | Hui et al. | |
| 2014/0266574 A1 | 9/2014 | Whitson, Jr. | |
| 2014/0314062 A1* | 10/2014 | Loebs | ................. H04L 12/2803 370/338 |
| 2014/0338428 A1 | 11/2014 | Bright | |
| 2014/0346122 A1 | 11/2014 | Kasten | |
| 2015/0048032 A1 | 2/2015 | Rodriguez | |
| 2015/0160178 A1 | 6/2015 | Lee | |

OTHER PUBLICATIONS

Connected Yard. Pool care made simple—The story behind pHin. pHin.2016. pp. 1-6. Connected Yard.
EPOOL. epool Smart System. Great American Merchandise & Events. 2016. pp. 1-2. GAME.
SUTRO. The Smart Pool Chemistry Monitor. Sutro. 2016. pp. 1-11. SUTRO.

* cited by examiner

*Primary Examiner* — Tejal Gami
(74) *Attorney, Agent, or Firm* — Burr & Forman, LLP

(57) ABSTRACT

A fluid monitoring system is provided to detecting and modifying conditions relating to fluid. The fluid monitoring system may include a sensor component, sensors, analytic component, interface, control component and server. A method for detecting and modifying conditions relating to fluid flow using the fluid monitoring system is also provided.

20 Claims, 11 Drawing Sheets

| ID | PRESSURE | TEMP °F | HUMIDITY |
|---|---|---|---|
| 2173 | 225.0 | 84.75 | 68.01 |
| 2172 | 225.0 | 84.6 | 69.03 |
| 2171 | 226.0 | 84.96 | 64.47 |
| 2170 | 225.0 | 84.96 | 64.02 |
| 2169 | 225.0 | 84.96 | 63.72 |
| 2168 | 226.0 | 85.04 | 64.49 |
| 2167 | 224.0 | 84.89 | 61.99 |
| 2166 | 225.0 | 85.18 | 63.09 |
| 2165 | 225.0 | 85.04 | 62.83 |
| 2164 | 226.0 | 85.18 | 62.0 |
| 2163 | 226.0 | 85.18 | 60.7 |

OVERVIEW  DETAIL  SETTINGS  GRAPH

FIG. 6

FLUID MONITORING SYSTEM AND METHOD

CROSS-REFERENCE TO RELATED APPLICATION

This application claims the priority from U.S. provisional patent application Ser. No. 62/336,810 filed May 16, 2016. The foregoing application is incorporated in its entirety herein by reference.

FIELD OF THE INVENTION

The present disclosure relates to a fluid monitoring system. More particularly, the disclosure relates to detecting and modifying conditions relating to leaks, fluid flow, and other fluid properties.

BACKGROUND

Throughout much of human history, people have been building and maintaining pools. Often used for recreational or competitive swimming, these water reservoirs require a significant amount of monitoring and maintenance to ensure adequate fill levels and chemical balances. However, inefficiency plagues traditional monitoring techniques, often requiring gauging a condition with a low degree of accuracy and generally guessing as to the cause of the problem through anecdotal experience. Maintenance of a pool or reservoir also generally requires frequent replenishment of water, chemical additives, and other elements in response to a condition perceived through traditional monitoring techniques. Traditional monitoring and maintenance typically also requires a person to physically interact with the pool or reservoir at virtually every step. The present manual nature of pool monitoring and maintenance lacks the advantages that could be provided by a novel and connected system to monitor and maintain the reservoir.

Additionally, fluids can create problems within additional environments if not properly monitored and controlled. For example, a leaking toilet in a house or apartment may result in large water bills due to wasted water caused by a leak. In another example, leaks inside of walls or under a basement of a building may cause damage to that building. Additionally, undetected or improperly controlled leaks can contribute to mold growth, which can substantially increase health risks.

Therefore, a need exists to solve the deficiencies present in the prior art. What is needed is a system to monitor a condition of a liquid reservoir. What is needed is a system to monitor a reservoir, such as a pool, to detect a leak. What is needed is a system to analyze conditions sensed in a reservoir, the analysis being performable via a network-connected computerized device. What is needed is a system capable of remotely analyzing sensed data and storing data in a database sharable with third party applications via an API. What is needed is a system for monitoring fluid flow conditions in an environment, such as a household, to detect an anomaly or undesirable condition. What is needed is a system and method to monitor a fluid to detect a related condition.

SUMMARY

An aspect of the disclosure advantageously provides a system to monitor a condition of a liquid reservoir. An aspect of the disclosure advantageously provides a system to monitor a reservoir, such as a pool, to detect a leak. An aspect of the disclosure advantageously provides a system to analyze conditions sensed in a reservoir, the analysis being performable via a network-connected computerized device. An aspect of the disclosure advantageously provides a system capable of remotely analyzing sensed data and storing data in a database sharable with third party applications via an API. An aspect of the disclosure advantageously provides a system for monitoring fluid flow conditions in an environment, such as a household, to detect an anomaly or undesirable condition. An aspect of the disclosure advantageously provides a system and method to monitor a fluid to detect a related condition.

Accordingly, the disclosure may feature a system operable to detect a condition relating to fluid management including a sensor component, an analytic component, and an interface. The sensor component may receive data from a sensor indicative of the condition relating to a fluid. The analytic component may be communicatively connected to the sensor component to receive the data, at least partially analyze the data, and provide information regarding the condition. The interface may be used to access the information.

In another aspect, the analytic component may be communicatively connected to a database to access at least part of the data and store at least part of the information. At least part of the information may be accessible from the database via the interface.

In another aspect, the disclosure may include a control component to alter the condition. The control component may at least partially manage the fluid relative to the condition.

In another aspect, the disclosure may include an application programming interface (API) operable to communicate instructions with connected programs. Access privileges may be at least partially restricted between the connected programs, the sensor component, and the analytic component via the API.

In another aspect, the disclosure may include a control component to alter the condition. The control component may at least partially manage the fluid relative to the condition. The control component may be at least partially operable via the API. The access privileges may be at least partially restricted between the connected programs and the control component via the API.

In another aspect, the condition may include a stored fluid condition relating to the fluid that is stored in a reservoir.

In another aspect, the stored fluid condition may include a fluid level and a fluid rate at which the fluid level changes. The data that relates to the stored fluid condition may be analyzable by the analytic component to detect an anomaly.

In another aspect, the sensor component may be communicatively connected to the sensor to detect the condition and derive the data that relates to the condition.

In another aspect, the sensor may include a fluid pressure sensor to detect a fluid pressure applied by the fluid. The sensor may include an atmospheric pressure sensor to detect an atmospheric pressure applied to the fluid. The analytic component may compare at least part of the data from the fluid pressure sensor and at least part of the data from the atmospheric pressure sensor to determine a likelihood of an anomaly.

In another aspect, the sensor may include a fluid transmission sensor to detect a flow behavior of the fluid that travels through a transmission medium. The sensor component may be communicatively connected to the fluid transmission sensor that may communicate at least part of the data from the fluid transmission sensor to the analytic component to determine a likelihood of an anomaly.

In another aspect, the sensor component may be installable in an enclosure. The enclosure may be installable within a reservoir. The reservoir may hold at least some of the fluid of which the condition relates. The sensor component may be communicatively connected to the analytic component.

In another aspect, the sensor component may be communicatively connected to the analytic component via a network. At least part of the data may be communicable between the sensor component and the analytic component wirelessly.

According to an embodiment of this disclosure, a system may be provided that is operable to detect a condition relating to fluid management. The system may include a sensor component, an analytic component, a database, a control component, and an application programming interface (API). The sensor component may receive data from a sensor indicative of the condition relating to a fluid. The analytic component may be communicatively connected to the sensor component to receive the data, at least partially analyze the data, and provide information regarding the condition. The database may be communicatively connected to the analytic component to provide access to at least part of the data and store at least part of the information. The control component may alter the condition. The application programming interface (API) may be operable to communicate instructions with connected programs. At least part of the information may be accessible from the database via an interface. The control component may at least partially manage the fluid relative to the condition. Access privileges may be at least partially restricted between the connected programs, the sensor component, and the analytic component via the API. The sensor component may be communicatively connected to the analytic component via a network.

In another aspect, the control component may at least partially manage the fluid relative to the condition. The control component may be at least partially operable via the API. The access privileges may be at least partially restricted between the connected programs and the control component via the API. The sensor component may be communicatively connected to the sensor to detect the condition and derive the data that relates to the condition.

In another aspect, the condition may include a stored fluid condition relating to the fluid that is stored in a reservoir. The stored fluid condition may include a fluid level and a fluid rate at which the fluid level changes. The data that relates to the stored fluid condition may be analyzable by the analytic component to detect an anomaly.

In another aspect, the sensor may include a fluid pressure sensor, an atmospheric pressure sensor, and a fluid transmission sensor. The fluid pressure sensor may detect a fluid pressure applied by the fluid. The atmospheric pressure sensor may detect an atmospheric pressure applied to the fluid. The fluid transmission sensor may detect a flow behavior of the fluid that travels through a transmission medium. The analytic component may compare at least part of the data from the fluid pressure sensor and at least part of the data from the atmospheric pressure sensor to determine a likelihood of an anomaly. The sensor component may be communicatively connected to the fluid transmission sensor and may communicate at least part of the data from the fluid transmission sensor to the analytic component to determine the likelihood of the anomaly.

According to an embodiment of this disclosure, a method is provided for detecting a condition relating to fluid management. The method may include (a) receiving data by a sensor component from a sensor indicative of the condition relating to a fluid. The method may also include (b) communicating the data between the sensor component and an analytic component communicatively connected to the sensor component to at least partially analyze the data. The method may include (c) providing information by the analytic component regarding the condition. Furthermore, the method may include (d) providing access to the information via an interface. The analytic component may be communicatively connected to a database to access at least part of the data and store at least part of the information. At least part of the information may be accessible from the database via the interface.

In another aspect, the method may further include (e) altering the condition via a control component. Additionally, the method may include (f) communicating instructions with connected programs via an application programming interface (API). The control component may at least partially manage the fluid relative to the condition. The control component may be at least partially operable via the API. Access privileges may be at least partially restricted between the connected programs and the control component via the API.

In another aspect, the condition may include a stored fluid condition relating to the fluid that is stored in a reservoir. The stored fluid condition may include a fluid level and a fluid rate at which the fluid level changes. The data that may relate to the stored fluid condition is analyzable by the analytic component to detect an anomaly.

In another aspect, step (a) may further include (i) detecting the condition from the sensor connected to the sensor component, and deriving the data that relates to the condition. Step (b) may further include (i) analyzing data from a fluid pressure sensor to detect a fluid pressure applied by the fluid, (ii) analyzing data from an atmospheric pressure sensor to detect an atmospheric pressure applied to the fluid, and (iii) comparing at least part of the data from the fluid pressure sensor and at least part of the data from the atmospheric pressure sensor to determine a likelihood of an anomaly.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings in which like numerals represent like components.

BRIEF DESCRIPTION OF THE DRAWINGS

FIG. 6 is a diagram view of an illustrative interface page displaying details, according to an embodiment of this disclosure.

DETAILED DESCRIPTION

Figure 1:
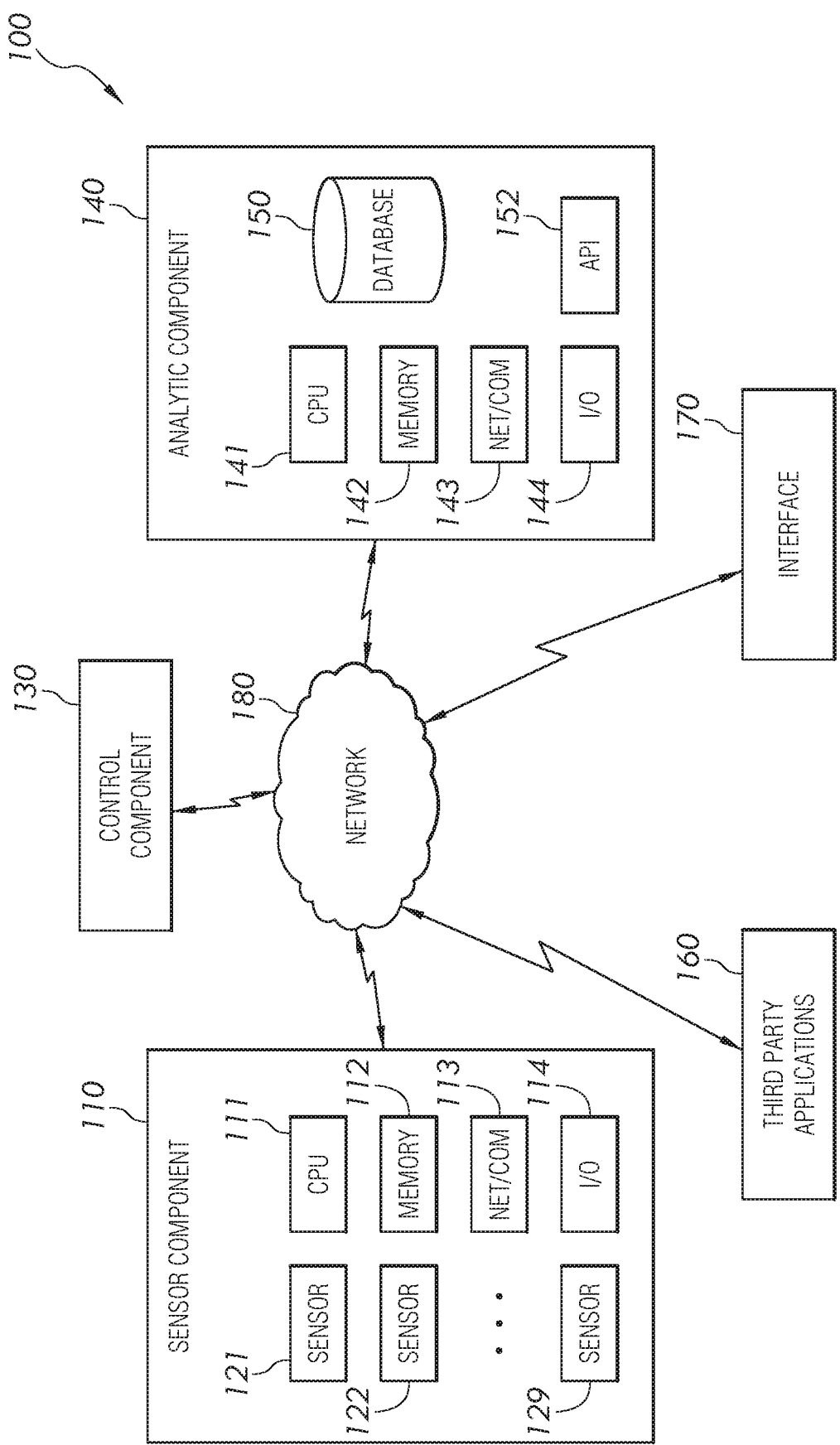
FIG. 1 is a block diagram view of an illustrative fluid monitoring system, according to an embodiment of this disclosure.

The following disclosure is provided to describe various embodiments of a fluid monitoring system. Skilled artisans will appreciate additional embodiments and uses of the present invention that extend beyond the examples of this disclosure. Terms included by any claim are to be interpreted as defined within this disclosure. Singular forms should be read to contemplate and disclose plural alternatives. Similarly, plural forms should be read to contemplate and disclose singular alternatives. Conjunctions should be read as inclusive except where stated otherwise.

Expressions such as "at least one of A, B, and C" should be read to permit any of A, B, or C singularly or in combination with the remaining elements. Additionally, such groups may include multiple instances of one or more element in that group, which may be included with other elements of the group. All numbers, measurements, and values are given as approximations unless expressly stated otherwise.

Various aspects of the present disclosure will now be described in detail, without limitation. In the following disclosure, a fluid monitoring system will be discussed. Those of skill in the art will appreciate alternative labeling of the fluid monitoring system as a reservoir monitoring system, pool monitoring system, pool detection and maintenance system, pool analytics system, pool system, reservoir system, fluid monitoring system, basin system, the invention, or other similar names. Similarly, those of skill in the art will appreciate alternative labeling of the fluid monitoring system as a pool monitoring and maintenance method, reservoir sensing and analyzing method, network-leveraged pool monitoring and communication method, network-leveraged fluid monitoring and controlling method, leak detection method, method, operation, the invention, or other similar names. Skilled readers should not view the inclusion of any alternative labels as limiting in any way.

Referring now to FIGS. 1-12, the fluid monitoring system will now be discussed in more detail. The fluid monitoring system may include a sensor component, sensors, analytic component, interface, control component, server, and additional components that will be discussed in greater detail below. The fluid monitoring system may operate one or more of these components interactively with other components to detecting and modifying conditions relating to fluid flow.

Throughout this disclosure, example applications may be described featuring a reservoir or household application. Fluid can be moved throughout a household or reservoir via a transmission medium, for example, pipes and fittings. References to a pool may be given as an example of a reservoir that can be monitored using the fluid monitoring system and method of this disclosure. Use of a pool as an illustrative reservoir is not intended to limit the scope of this disclosure in any way. Similarly, discussion of embodiments using water as the illustrative fluid should not be read to limit those, or any other, embodiments to solely water-based applications. Skilled artisans will appreciate additional applications of this disclosure beyond installation of the system in a pool or similar reservoir.

Referring now to FIG. 1, an illustrative fluid monitoring system will be discussed. Skilled artisans will appreciate that the illustrative fluid monitoring system associated with FIG. 1 is provided as an example to clearly illustrate one of many embodiments of the invention. Persons skilled in the art will further appreciate additional embodiments that would be included within the scope and spirit of this disclosure.

The fluid monitoring system 100 may include a sensor component 110, an analytic component 140, and additional components that may be connected, for example, via a network 180. The additional components may include control components 130, an interface 170, third-party applications 160, and other components that would be appreciated by those of skill in the art.

Figure 3:
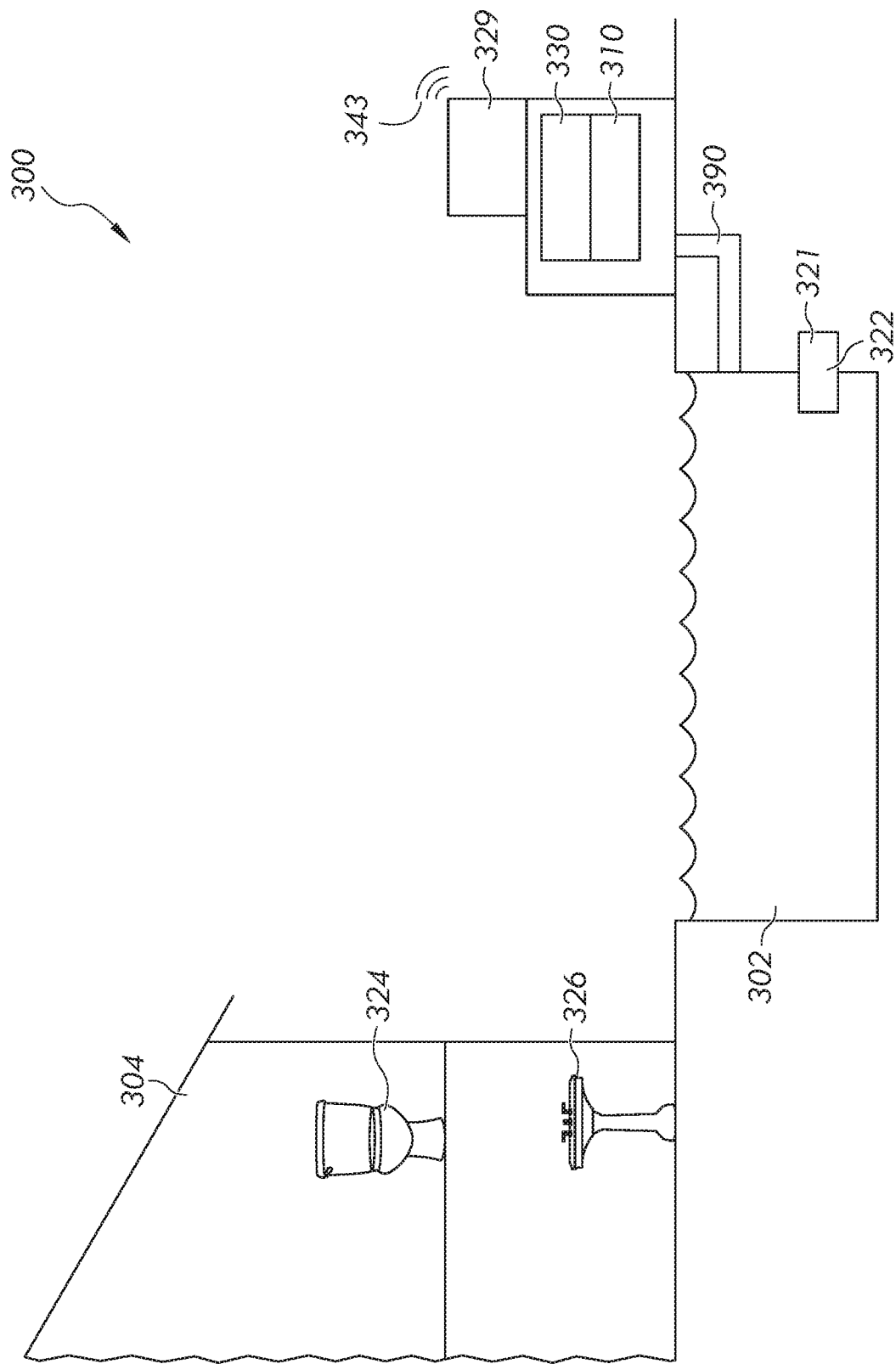
FIG. 3 is a diagram view of an illustrative environment in which a fluid may be monitored and/or affected, according to an embodiment of this disclosure.

The sensor component will now be discussed in greater detail. FIGS. 1 and 3 highlight examples of the sensor component, which may also be shown in other figures. The sensor component 110 may include one or more sensors 121, 122, . . . , 129 to detect a condition in the reservoir and/or environment. Skilled artisans will appreciate virtually any number of sensors may be operatively connected to the sensor component, without limitation. Alternatively, one or more sensors may be communicatively connected to the sensor component 110 to detect a condition in the reservoir and/or environment. In some embodiments, the sensor component 110 may communicate with one or more directly and/or indirectly connected sensors 121, 122, . . . , 129 to detect conditions in the reservoir and/or environment.

The sensor component 110 may additionally include a processor 111, memory 112, network interface 113, and/or an input/output (I/O) interface 114. The sensor component 110 may be operable as a computerized device. An illustrative computerized device will be described in more detail below. The sensor component 110 may communicate with additional components of the system over a network 180, for example, the Internet. Network communication may be facilitated using the network communication interface 113.

Figure 4:
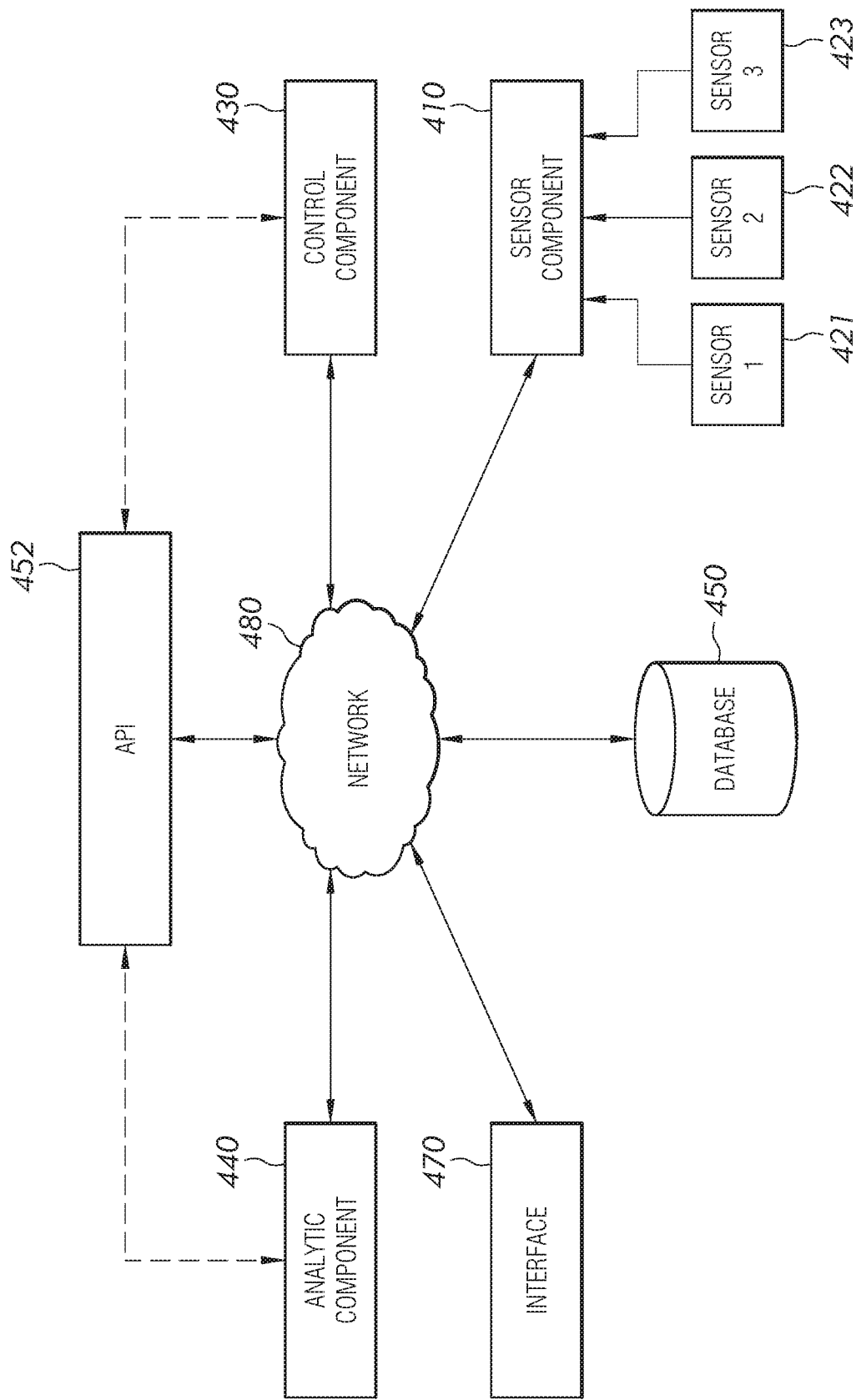
FIG. 4 is a block diagram view of an illustrative network-connected system for monitoring fluids, according to an embodiment of this disclosure.

The sensors will now be discussed in greater detail. FIGS. 1 and 3-4 highlight examples of the sensors, which may also be shown in other figures. The sensors may communicate data with the sensor component 110. The data detected by the sensors 121, 122, . . . , 129 may indicate a condition in the reservoir and/or environment. The data communicated by the sensors may be provided as analog and/or digital signals. For example, a sensor may communicate an analog voltage level relative to a detected condition of the environment. In another example, a sensor may communicate a digital value corresponding with a detected condition in the environment. An analog-to-digital converter may be used with the sensor to convert a signal of an analog sensor to a digital signal, which may be more easily analyzed by the other components of the system 100.

Various sensors may be included by the system 100 to detect several conditions in the environment. Conditions detected by the sensors may include, but are not limited to, water level, pressure, temperature, humidity, barometric conditions, weather history, water flow, chemical balance, pH levels, oxygen reduction potential (ORP), calcium levels, and other conditions. The sensors may be connected to a controller, such as included by the sensor component 110. The data detected by the sensors may be analyzed by the sensor component 110 and/or an analytic component 140 to derive data and information about additional conditions of the environment. The sensor component 110 may communicate data received by the sensors 121, 122, . . . , 129 over a network 180 to connected devices, such as the analytic component 140.

In one illustrative application, the sensors may detect one or more pressure levels in an environment. For example, a sensor of the system may be a transducer. As will be appreciated by a person of skill in the art, a transducer may convert one form of energy to another. A pressure-sensing transducer sensor may receive and respond to a stimulus by creating a corresponding signal. A pressure sensor may measure a pressure that relates to a reservoir being monitored, for example, to calculate a water level. A pressure sensor may be included to determine an air pressure and/or a liquid pressure. The detected pressure may correspond with an electrical signal generated by the sensor, which may be received by the sensor component 110.

In one example, the system may include at least two pressure sensors. A first pressure sensor may be installed at least partially within a first tube. The first pressure sensor may substantially seal a first end of the first tube. The second end of the tube may remain open, allowing the passage of a fluid. The tube with the pressure sensor may be at least partially submerged within the liquid held by the reservoir. A volume of air or another gas may be included within the tube between the first pressure sensor at the first end of the tube and the liquid entering the second end of the tube. As water or another liquid is added to the reservoir, the added weight of the liquid may cause the air pressure within the tube to increase. Similarly, if water is removed from the reservoir, for example via evaporation or a leak, the air pressure within the tube may decrease. This change in pressure may be detected by the first pressure sensor and communicated to the sensor component.

A second pressure sensor may be included outside of the reservoir to detect a second pressure, for example, a barometric pressure. Barometric pressure may affect the amount of pressure applied by the water in the reservoir, and thus, on the air in the first tube. Since pressure detected by the first pressure sensor may be affected by external conditions, such as the barometric pressure, inclusion of a second pressure sensor advantageously provides data that can help normalize the detected condition. Normalization and other analytical functions may be performed via the analytic component 140 and/or sensor component 110.

Additional sensors may be included to detect a condition in the environment. These additional sensors may detect conditions that could affect evaporation of the water or other liquid held within the reservoir, such as humidity and air temperature. The sensed conditions may be communicated to the sensor component 110, which may be further analyzed to derive additional data relevant to the environment.

Sensors may be included to detect properties of the water or other liquid held within the reservoir. For example, sensors may detect the chemical composition of water in a pool. Detectable chemical properties may include chlorine levels, bromine levels, pH, oxygen reduction potential (ORP), calcium levels, phosphates, alkalinity, dissolved solids, biological activity, and other conditions.

Sensors may be included to detect conditions that relate to depletion and replenishment of water or another liquid in the reservoir. Additionally, sensors may be included in household applications, such as at where water enters the house from the main or selectable points of water use. Illustrative points of water use may include a sink, toilet, hose, pool refilling device, dishwasher, and/or other devices that may use water. For example, a flow sensor may be included near a water source to detect a volume of water provided to a reservoir, such as to replenish a depleted water level, or at another point of water use. In another example, a flow sensor may be included near a drain to detect water removed from the reservoir, such as due to excessive water above a desired water level, or water used by the point of water use.

Skilled artisans will appreciate additional sensors that may be included by the system consistent with the scope and spirit of this disclosure.

The analytic component will now be discussed in greater detail. FIGS. 1 and 4 highlight examples of the analytic component, which may also be shown in other figures. The analytic component 140 may be communicatively connected to the sensor component 110, for example, over a network 180. The analytic component 140 may include a processor 141, memory 142, network communication interface 143, and I/O interface 144. The analytic component 140 may additionally include a database 150. The database 150 accessible by the analytic component 140 may be physically connected to the analytic component 140 and/or communicatively connected to the analytic component 140 via the network 180. For example, the analytic component 140 may retrieve and store data on a cloud-connected database.

The analytic component 140 may additionally include an application programming interface (API) 152 to facilitate sharing of detected and derived data with third party applications 160. The API 152 may facilitate development and integration of the system described by this disclosure with third-party applications 160 and other products. Access to features of the API 152 may be controlled by an administrator, which may be selectively enabled according to customer identity, licensing terms, or another condition. The API 152 may additionally manage access restrictions among connected components and/or third party applications 160. The API 152 may include a library with specifications for routines, data structures, object classes, variables, and other aspects for application development.

In one embodiment, at least part of the analytic component 140 may be hosted in the cloud. The analytic component 140 may receive the information detected by the sensor component 110 for analysis. The analytic component 140 may calculate additional information about the reservoir, such as a water level, using the sensed information. The analytic component may also communicate with and/or control one or more accessories associated with the reservoir. This controlling of connected accessories may affect the environment of the reservoir. The analytic component 140 may additionally communicate with an interface 170, through which a user may monitor detected and/or calculated conditions of the reservoir or other point of water use. Information associated with the analytic component 140 may optionally be provided to third-party products or services, such as through the API 152.

The analytic component 140 may analyze sensed data to derive additional data, which may be useful to determine a condition of the reservoir and surrounding environment. Data may be communicated between the sensor component 110 and the analytic component 140 over a network 180, for example, the Internet.

In one example, the analytic component 140 may receive data relating to the first and second pressures in the previously described illustrative application. For this example, the first pressure may be indicative of the pressure applied by water in a pool and the second pressure may be indicative of a barometric pressure. The analytic component 140 may calculate a water volume held by the pool from analysis of the sense pressure data. Additional derived data may be produced by analyzing sets of derived and/or sensed data. For example, the water volume could be analyzed over time to derive a rate of water depletion. Humidity and temperature data may be analyzed with derived data to determine a portion of depleted water cause by evaporation. A rain sensor may provide additional data, which may indicate how much depleted water was replaced by precipitation. Various other sets of sensed and derived data may be processed by the analytic component 140 to determine useful information about the reservoir and surrounding environment.

In one embodiment, the analytic component 140 may perform calculations on the sense data using a flexible, remote-connected computing platform. For example, the analytic component 140 may include one or more processing units that could be selectively leveraged to flexibly match computing resources with present computing demands. Computing resources to analyze the data could be implemented using an Infrastructure as a Service (IaaS) or Platform as a Service (PaaS) model. Sensed and/or derived data may be stored and accessed using a flexible database, such as an elastic virtual storage space. Multiple instances of data may be stored on various servers to increase redundancy and protect against data lost. Data may be accessed from remote and/or local databases 150 through the API 152.

The analytic component 140 may optionally calculate desired derived information in substantially real time, the calculated derived information being storable in the database 150. Alternatively, the analytic component 140 may calculate the derived information from the source information substantially as it is requested by a user, API 152, or other client device that wishes to use the information. By providing substantially on-demand derived data calculation capability, the analytic component 140 may conserve processing cycles otherwise requested for calculating data that is not requested for view or analysis. In one embodiment, the analytic component 140 may be configured to calculate the derived information periodically, to facilitate quick access to the information calculated in each period. Optionally, the analytic component 140 may be requested to analyze and determine a substantially real-time set of sensed and derived information on-demand.

The interface will now be discussed in greater detail. FIGS. 1 and 4-8 highlight examples of the interface, which may also be shown in other figures. The interface 170 may provide information to a user about a condition of a reservoir and/or environment. The information that can be provided by the interface may include sensed and derived information. The information may be provided to the interface 170 from the analytic component 140, the information being accessed from the database 150. In another embodiment, an interface 170 may access the information to be displayed to the user through the API 152. An interface 170 may use the API 152 to access data made available through the API 152, which can include sensed data and/or derived information. The analytic component 140 may be remotely instructed to calculate additional derived information by operation of the interface.

Additionally, the interface 170 may be manipulated by a user to affect a control component 130, which may control a condition of the reservoir, household, point of installation, and/or environment. Commands sent by the interface 170 may be directed to a control component 130, which may be communicatively connected to the interface 170 over the network 180.

The control component will now be discussed in greater detail. FIGS. 1 and 3-4 highlight examples of the control component, which may also be shown in other figures. The control component 130 may provide remote manipulation of the reservoir, environment around the reservoir, household, and/or other point of installation. The control component 130 may receive instructions from the analytic component 140, interface 170, or other aspects and components communicatively connected to the control component 130. The control component 130 may affect operation of switches, relays, actuators, or other components capable of changing a condition of the reservoir, household, point of installation, and/or another environment. Optionally, control components 130 may share hardware with the sensor components 110. Shared hardware may include the processor 121, memory 122, network communications interface 123, I/O 124, and/or other hardware aspects.

In one example, provided without limitation, the control component 130 may affect a pool water source, which may be controlled to refill a depleted water level. In another example, the control component 130 may additionally control a chemical release device to maintain desired chemical properties in the reservoir. In one example, the control component 130 may control a flow regulation component to disable the flow of a fluid upon detection of a leak condition. Skilled artisans will appreciate additional devices and accessories that may operate with the control component after having the benefit of this disclosure.

Figure 2:
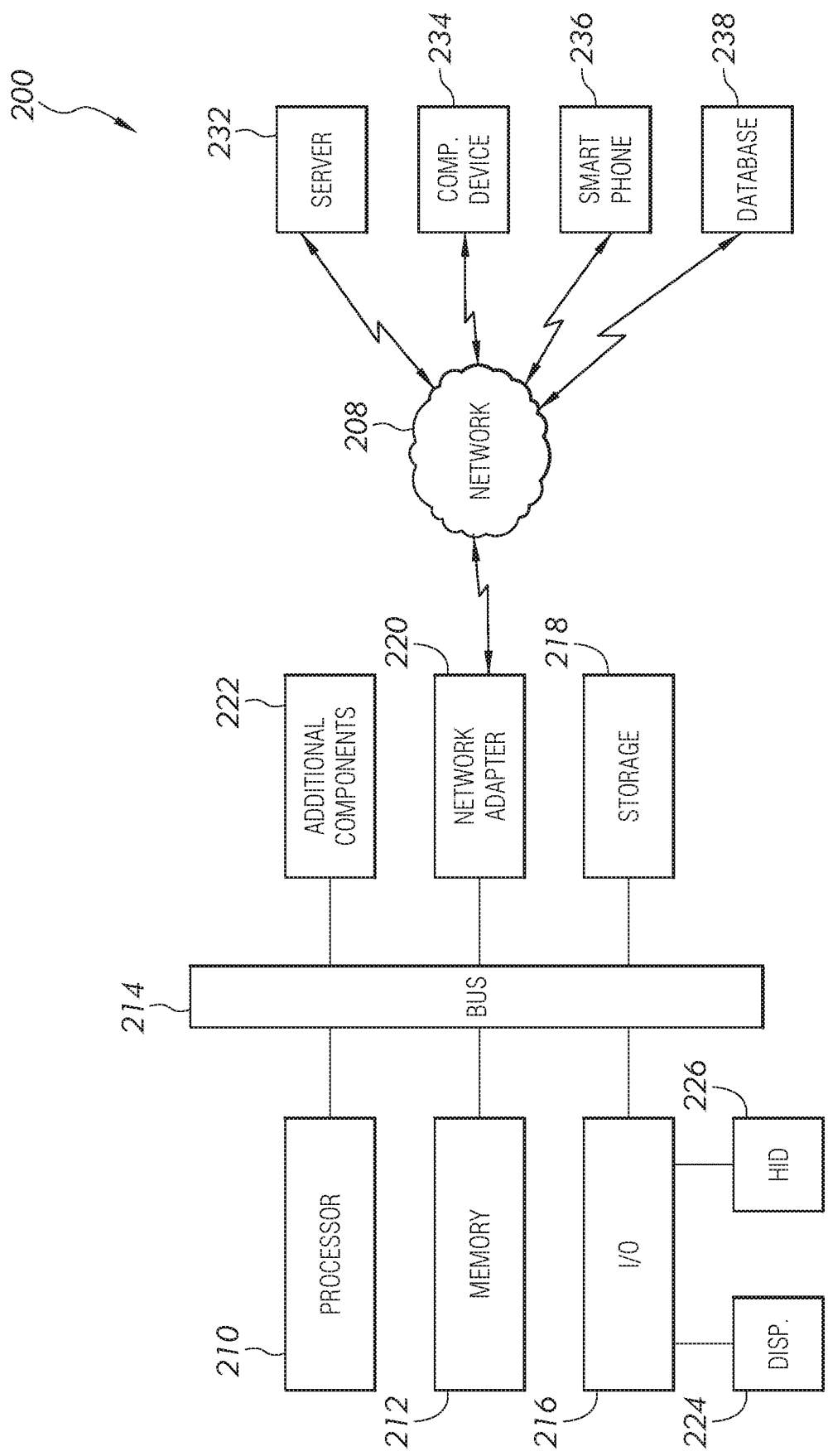
FIG. 2 is a block diagram view of an illustrative computerized device, according to an embodiment of this disclosure.

The server will now be discussed in greater detail. FIG. 2 highlights examples of the server, which may also be shown in other figures. One or more components of this disclosure may be operable using a network-connected server. For example, one or more components of this disclosure may be operated on a distributed processing platform that provides scalable processing capabilities and/or memory allocation to substantially match present computational demand. Such server systems may leverage elastic computing techniques, cloud-based distributed server systems, and/or other networked computing platforms. Skilled artisans will appreciate additional ways in which a server may be used with the various stated components after having the benefit of this disclosure.

In one example, the analytic component 140 may be operated on a network-connected server. The analytic component 140 may receive one or more data transmissions from a sensor component 110, for example, over a network 180. The data may relate to conditions detected by sensors connected to the sensor component 110. The analytic component 140 may allocate scaled system resources necessary to perform the desired analysis on the received data to derive information about a detected condition. Once the data is analyzed and the desired information determined, the analytic component 140 may transmit the information and/or data to a database 150, interface 170, API 152, third party application 160, control component 130, and/or another connected device or component, for example, over the network 180.

An illustrative enclosure will now be discussed in greater detail. One or more components of this disclosure may be installed at least partially within an enclosure. For example, at least part of the sensors communicable with the sensor component may be installable within a light fixture of the reservoir. An example of such a light fixture may include a pool light. The sensor component may be at least partially installed within a substantially weather-resistant enclosure. Components may be installed in shared enclosures, which may each provide protective, operational, and other advantages. Additional elements may be included within an enclosure, such as a light source, power supply, antenna, and other components that would be apparent to a person of skill in the art after having the benefit of this disclosure.

Referring now to FIG. 2, an illustrative computerized device will be discussed, without limitation. Various aspects and functions described in accord with the present disclosure may be implemented as hardware or software on one or more illustrative computerized devices 200 or other computerized devices. There are many examples of illustrative computerized devices 200 currently in use that may be suitable for implementing various aspects of the present disclosure. Some examples include, among others, network appliances, personal computers, workstations, mainframes, networked clients, servers, media servers, application servers, database servers and web servers. Other examples of illustrative computerized devices 200 may include mobile computing devices, cellular phones, smartphones, tablets, video game devices, personal digital assistants, network equipment, devices involved in commerce such as point of sale equipment and systems, such as handheld scanners, magnetic stripe readers, bar code scanners and their associated illustrative computerized device 200, among others. Additionally, aspects in accord with the present disclosure may be located on a single illustrative computerized device 200 or may be distributed among one or more illustrative computerized devices 200 connected to one or more communication networks.

For example, various aspects and functions may be distributed among one or more illustrative computerized devices 200 configured to provide a service to one or more client computers, or to perform an overall task as part of a distributed system. Additionally, aspects may be performed on a client-server or multi-tier system that includes components distributed among one or more server systems that perform various functions. Thus, the disclosure is not limited to executing on any particular system or group of systems. Further, aspects may be implemented in software, hardware or firmware, or any combination thereof. Thus, aspects in accord with the present disclosure may be implemented within methods, acts, systems, system elements and components using a variety of hardware and software configurations, and the disclosure is not limited to any particular distributed architecture, network, or communication protocol.

FIG. 2 shows a block diagram of an illustrative computerized device 200, in which various aspects and functions in accord with the present disclosure may be practiced. The illustrative computerized device 200 may include one or more illustrative computerized devices 200. The illustrative computerized devices 200 included by the illustrative computerized device may be interconnected by, and may exchange data through, a communication network 208. Data may be communicated via the illustrative computerized device using a wireless and/or wired network connection.

Network 208 may include any communication network through which illustrative computerized devices 200 may exchange data. To exchange data via network 208, systems and/or components of the illustrative computerized device 200 and the network 208 may use various methods, protocols and standards including, among others, Ethernet, Wi-Fi, Bluetooth, TCP/IP, UDP, HTTP, FTP, SNMP, SMS, MMS, SS7, JSON, XML, REST, SOAP, RMI, DCOM, and/or Web Services, without limitation. To ensure data transfer is secure, the systems and/or modules of the illustrative computerized device 200 may transmit data via the network 208 using a variety of security measures including TSL, SSL, or VPN, among other security techniques. The illustrative computerized device 200 may include any number of illustrative computerized devices 200 and/or components, which may be networked using virtually any medium and communication protocol or combination of protocols.

Various aspects and functions in accord with the present disclosure may be implemented as specialized hardware or software executing in one or more illustrative computerized devices 200, including an illustrative computerized device 200 shown in FIG. 2. As depicted, the illustrative computerized device 200 may include a processor 210, memory 212, a bus 214 or other internal communication system, an input/output (I/O) interface 216, a storage system 218, and/or a network communication device 220. Additional devices 222 may be selectively connected to the computerized device via the bus 214. Processor 210, which may include one or more microprocessors or other types of controllers, can perform a series of instructions that result in manipulated data. Processor 210 may be a commercially available processor such as an ARM, x86, Intel Core, Intel Pentium, Motorola PowerPC, SGI MIPS, Sun UltraSPARC, or Hewlett-Packard PA-RISC processor, but may be any type of processor or controller as many other processors and controllers are available. As shown, processor 210 may be connected to other system elements, including a memory 212, by bus 214.

The illustrative computerized device 200 may also include a network communication device 220. The network communication device 220 may receive data from other components of the computerized device to be communicated with servers 232, databases 234, smart phones 236, and/or other computerized devices 238 via a network 208. The communication of data may optionally be performed wirelessly. More specifically, without limitation, the network communication device 220 may communicate and relay information from one or more components of the illustrative computerized device 200, or other devices and/or components connected to the computerized device 200, to additional connected devices 232, 234, 236, and/or 238. Connected devices are intended to include, without limitation, data servers, additional computerized devices, mobile computing devices, smart phones, tablet computers, and other electronic devices that may communicate digitally with another device. In one example, the illustrative computerized device 200 may be used as a server to analyze and communicate data between connected devices.

The illustrative computerized device 200 may communicate with one or more connected devices via a communications network 208. The computerized device 200 may communicate over the network 208 by using its network communication device 220. More specifically, the network communication device 220 of the computerized device 200 may communicate with the network communication devices or network controllers of the connected devices. The network 208 may be, for example, the internet. As another example, the network 208 may be a WLAN. However, skilled artisans will appreciate additional networks to be included within the scope of this disclosure, such as intranets, local area networks, wide area networks, peer-to-peer networks, and various other network formats. Additionally, the illustrative computerized device 200 and/or connected devices 232, 234, 236, and/or 238 may communicate over the network 208 via a wired, wireless, or other connection, without limitation.

Memory 212 may be used for storing programs and/or data during operation of the illustrative computerized device 200. Thus, memory 212 may be a relatively high performance, volatile, random access memory such as a dynamic random access memory (DRAM) or static memory (SRAM). However, memory 212 may include any device for storing data, such as a disk drive or other non-volatile storage device. Various embodiments in accord with the present disclosure can organize memory 212 into particularized and, in some cases, unique structures to perform the aspects and functions of this disclosure.

Components of illustrative computerized device 200 may be coupled by an interconnection element such as bus 214. Bus 214 may include one or more physical busses (for example, busses between components that are integrated within a same machine), but may include any communication coupling between system elements including specialized or standard computing bus technologies such as USB, Thunderbolt, SATA, FireWire, IDE, SCSI, PCI and InfiniBand. Thus, bus 214 may enable communications (for example, data and instructions) to be exchanged between system components of the illustrative computerized device 200.

The illustrative computerized device 200 also may include one or more interface devices 216 such as input devices, output devices and combination input/output devices. Interface devices 216 may receive input or provide output. More particularly, output devices may render information for external presentation. Input devices may accept information from external sources. Examples of interface devices include, among others, keyboards, bar code scanners, mouse devices, trackballs, magnetic strip readers, microphones, touch screens, printing devices, display screens, speakers, network interface cards, etc. The interface devices 216 allow the illustrative computerized device 200 to exchange information and communicate with external entities, such as users and other systems.

Storage system 218 may include a computer readable and writeable nonvolatile storage medium in which instructions can be stored that define a program to be executed by the processor. Storage system 218 also may include information that is recorded, on or in, the medium, and this information may be processed by the program. More specifically, the information may be stored in one or more data structures specifically configured to conserve storage space or increase data exchange performance. The instructions may be persistently stored as encoded bits or signals, and the instructions may cause a processor to perform any of the functions described by the encoded bits or signals. The medium may, for example, be optical disk, magnetic disk or flash memory, among others. In operation, processor 210 or some other controller may cause data to be read from the nonvolatile recording medium into another memory, such as the memory 212, that allows for faster access to the information by the processor than does the storage medium included in the storage system 218. The memory may be located in storage system 218 or in memory 212. Processor 210 may manipulate the data within memory 212, and then copy the data to the medium associated with the storage system 218 after processing is completed. A variety of components may manage data movement between the medium and integrated circuit memory element and does not limit the disclosure. Further, the disclosure is not limited to a particular memory system or storage system.

Although the above described illustrative computerized device is shown by way of example as one type of illustrative computerized device upon which various aspects and functions in accord with the present disclosure may be practiced, aspects of the disclosure are not limited to being implemented on the illustrative computerized device 200 as shown in FIG. 2. Various aspects and functions in accord with the present disclosure may be practiced on one or more computers having components than that shown in FIG. 2. For instance, the illustrative computerized device 200 may include specially-programmed, special-purpose hardware, such as for example, an application-specific integrated circuit (ASIC) tailored to perform a particular operation disclosed in this example. While another embodiment may perform essentially the same function using several general-purpose computing devices running Windows, Linux, Unix, Android, iOS, MAC OS X, or other operating systems on the aforementioned processors and/or specialized computing devices running proprietary hardware and operating systems.

The illustrative computerized device 200 may include an operating system that manages at least a portion of the hardware elements included in illustrative computerized device 200. A processor or controller, such as processor 210, may execute an operating system which may be, among others, an operating system, one of the above mentioned operating systems, one of many Linux-based operating system distributions, a UNIX operating system, or another operating system that would be apparent to skilled artisans. Many other operating systems may be used, and embodiments are not limited to any particular operating system.

The processor and operating system may work together define a computing platform for which application programs in high-level programming languages may be written. These component applications may be executable, intermediate (for example, C# or JAVA bytecode) or interpreted code which communicate over a communication network (for example, the Internet) using a communication protocol (for example, TCP/IP). Similarly, aspects in accord with the present disclosure may be implemented using an object-oriented programming language, such as JAVA, C, C++, C#, Python, PHP, Visual Basic .NET, JavaScript, Perl, Ruby, Delphi/Object Pascal, Visual Basic, Objective-C, Swift, MATLAB, PL/SQL, OpenEdge ABL, R, Fortran or other languages that would be apparent to skilled artisans. Other object-oriented programming languages may also be used. Alternatively, assembly, procedural, scripting, or logical programming languages may be used.

Additionally, various aspects and functions in accord with the present disclosure may be implemented in a non-programmed environment (for example, documents created in HTML5, HTML, XML, CSS, JavaScript, or other format that, when viewed in a window of a browser program, render aspects of a graphical-user interface or perform other functions). Further, various embodiments in accord with the present disclosure may be implemented as programmed or non-programmed elements, or any combination thereof. For example, a web page may be implemented using HTML while a data object called from within the web page may be written in C++. Thus, the disclosure is not limited to a specific programming language and any suitable programming language could also be used.

An illustrative computerized device included within an embodiment may perform functions outside the scope of the disclosure. For instance, aspects of the system may be implemented using an existing commercial product, such as, for example, Database Management Systems such as a SQL Server available from Microsoft of Redmond, Wash., Oracle Database or MySQL from Oracle of Redwood City, Calif., or integration software such as WebSphere middleware from IBM of Armonk, N.Y.

Referring now to block diagram 300 of FIG. 3, an illustrative implementation of the system will be discussed without limitation. This illustrative implementation depicts the reservoir 302 as a pool. Additionally, the illustrative implementation depicts a household 304 connected to the system that includes a sink and a toilet. Skilled artisans will appreciate the system of this disclosure to have additional applications beyond illustrative pool household installation.

The illustrative implementation may include a pool 302 located in an environment. Sensors 321, 322 may be located substantially within and near the pool 302. In one example, sensors 321, 322 may be included within a light housing enclosure installed within the pool 302. The sensors 321, 322 may use pressure readings to determine a depth of the pool 302 and/or other properties.

The sensors 321, 322 may be communicatively connected to a sensor component 310. The sensor component 310 may be installed in a housing or enclosure outside of the pool. In an alternative embodiment, the sensor component 310 may be at least partially included in a light housing enclosure installed within the pool 302. Skilled artisans will appreciate additional locations where a sensor housing may be installed after having the benefit of this disclosure.

Additionally, the illustrative implementation may include a pool and/or household 304 located in an environment. Sensors 324, 326 may be located in the household, for example, near points of water usage for a sink and a toilet. In one example, sensors 324, 326 may be included within enclosures installed near the respective points of water usage. The sensors 324, 326 may use flow readings to determine a flow condition over time for the point of usage and/or other properties. The sensors 324, 326 may be communicatively connected to the sensor component 310.

Control components 330 may also be located near the pool 302. A delivery system 390 may be controlled by the control components 330 to deliver water, chemicals, or other substances to the pool 302. In one example, control components 330 may be included near or with the sensor components 310. Optionally, the control components 330 may share hardware with the sensor components 310. Shared hardware may include the processor, memory, network communications interface, I/O, and other hardware aspects. The control components 330 may be operatively connected to devices and accessories located within and near the pool 302. Optionally, at least part of the control component 330 may be installed within a housing in the pool 302, such as the light housing.

The sensor component 310 may communicate with additional components of the system via a network. In one example, the sensor component 310 may operatively connect to an antenna, which may broadcast and/or receive data transmissions 343 with another device. The control component 330 may additionally communicate data 343 over a network. In one embodiment, the control component 330 and the sensor component 310 may share some or all network communication hardware.

Information may be received by the sensor component 310 from the sensors 321, 322, 324, 326. The information from the sensors may be communicated directly to an analytic component, which may be connected via the network. Additionally, the information may undergo preliminary analysis from the sensor component 310. For example, a thermal sensor may generate a voltage level corresponding with temperature. The voltage level may be transmitted from the sensor to the sensor component 310. The sensor component 310 may analyze the voltage level to determine a corresponding value, which may be stored as a variable. When communicating with the analytic component, the sensor component 310 may communicate the temperature variable instead of, and/or along with, the raw sensor signal.

Referring now to the block diagram of FIG. 4, an illustrative communicative structure will now be discussed, without limitation. Skilled artisans will appreciate that this communicative structure is provided in the interest of clearly illustrating one embodiment of how various components of this disclosure may be communicatively connected, without limitation. The various components may be connected directly or virtually, for example via a network. For example, the sensor component 410 may connect with various sensors 421, 422, 423. The sensors may be communicatively connected to the sensor component 410 via hardwire connections, networked connections, wireless data transmission, or another connective structure that would be appreciated by a person of skill in the art.

The sensor component 410 may be communicatively connected to the analytic component 440, database 450, and/or other components, for example, via a network. Data from the sensor component 410 may be shared directly with an analytic component 440 and/or stored in a database 450. The analytic component 440 may access the data stored in the database 450 when an analysis of the data is desired. The analytic component 440 may additionally transmit information derived from analyzing the data to the database 450, for example, indicating that a leak condition or other anomaly is likely.

The control component 430 and/or the analytic component 440 may be substantially directly connected to an API 452, which may facilitate operation of the system with third-party applications. The API 452 may additionally be connected to the database 450, sensor component 410, and/or interface 470, for example, via direct connection and/or connection over a network 480.

The interface 470 may be communicatively connected with additional components, for example, via the network 480. In one example, a user may view information stored in the database 450 regarding a condition of the environment. The user may view data received by the sensor component 410, information derived by the analytic component 440, operations received through the API 452, and/or other communications via the interface 470. Additionally, a user may alter one or more aspects of the environment using the control components 430 via the interface 470.

In one embodiment, the analytic component, database, and API may be provided via a web-based server connectable over the network. The web-based server may be communicatively connected to a locally installed computerized device on which the sensor component and control component are operated. In one example, the locally installed computerized device may be a WiFi enabled microcontroller or microprocessor-based board with communicatively attached sensors and/or control devices. The web-based server may additionally be communicatively connected to an interface to exchange information, display feedback, and/or control features to a user. Communication with the server and connected components may be performed using an applicable network protocol, for example, that include HTTP POST/GET requests. Communication of data by the sensor component may be performed periodically, at fixed intervals, at variable intervals, at user-definable instances, or otherwise.

In one example, a web-based server may enable storage and/or retrieval of sensor readings via a connected database. The database may store sensor readings received from the sensor component. The sensor readings may be communicated via an API, directly, or through a defined network tunneling protocol. Access may be controlled and/or restricted via the API. Communication of data and information over the network may require establishment of socket connections, for example TCP socket connections, authentication, and compliance with standard syntax. Authentication tokens may be assigned expiration values, and may require reauthentication upon expiration of a token. Valid authentication tokens may be required in a request to exchange data, for example, via HTTP.

Figure 5:
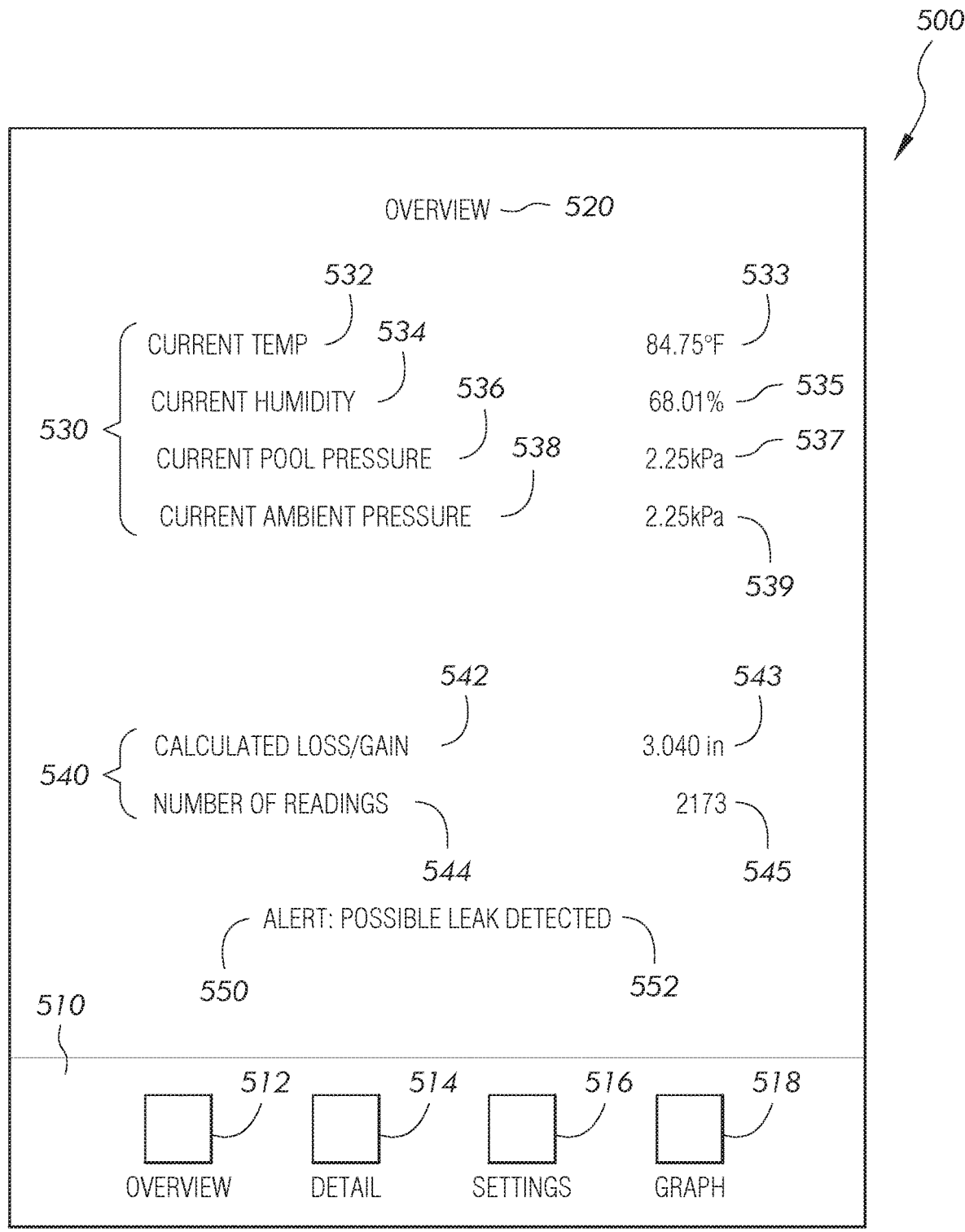
FIG. 5 is a diagram view of an illustrative interface page displaying an overview, according to an embodiment of this disclosure.

Referring now to diagram 500 of FIG. 5, an illustrative interface page displaying an overview will now be discussed, according to an embodiment of this disclosure. The overview page may include a title section 520, which may clearly identify the page as providing an overview of available data and information. The overview page may provide a sensor section 530 with labels and data for sensed conditions in an environment. Examples of details that may be provided by the sensor section 530 may include a current temp label 532 with corresponding illustrative sensor data 533 of 84.75*F, a current humidity label 534 with corresponding illustrative sensor data 535 of 68.01%, a current pool pressure label 536 with corresponding illustrative sensor data 537 of 2.25 kPa, and a current ambient pressure label 538 with corresponding illustrative sensor data 539 of 2.25 kPa.

The overview page may additionally include a derived information section 540, which may include information derived by the analytic component. Examples of details that may be provided by the derived information section 540 may include a calculated loss/gain label 542 with corresponding illustrative derived value 543 of 3.040 and a number of readings label 544 with corresponding illustrative value 545 of 2173.

The overview page may additionally include an alert section 550. If an anomaly is detected, or another situation occurs where the data, information, or other conditions are out of compliance with anticipated or acceptable levels, the alert section 550 may communicate such anomaly to a user via the interface. An illustrative alert 552 of a possible leak being detected is displayed here for demonstrative purposes. The alert section may be associated with an audible, visible, or otherwise detectable alarm that could be sounded by an electronic device on which the overview page may be displayed. An additional illustrative alarm may be displayed if unexpected pressure variations are detected by one or more of the sensors, which may be indicative of a child or unexpected guest being present in the pool or reservoir.

The illustrative interface may additionally include a navigation section 510, featuring links to this and other interface pages. The links may include an overview link 512, detail link 514, settings link 516, and graph link 518. Skilled artisans will appreciate that additional links may be includable for other pages or views providable by the interface.

Referring now to diagram 600 of FIG. 6, an illustrative interface page displaying details will now be discussed, according to an embodiment of this disclosure. The details may relate to sensed and/or derived conditions from each reading period. The details page may include a title section 620, which may indicate to a user what the data or information in each corresponding column represents. Examples of labels includable in the title section 620 may include a reading ID label 630, pressure label 640, temperature label 650, and humidity label 660. Skilled artisans will appreciate additional information that may be provided through the details page after having the benefit of this disclosure.

The details page may additionally provide information about sensed or derived data from a reading period in a values section 622. Columns of the details section may correspond with the labels in the title section 620, with like values matching like labels. For example, a first row of the values section may include a reading id 631 of 2173 corresponding with the reading ID label 630, a pressure value 641 of 225.0 corresponding with the pressure label 640, a temperature value 651 of 84.75 corresponding with the temperature label 650, and a humidity value 661 of 68.01 corresponding with the humidity label 660. As another example, a second row of the values section may include a reading id 632 of 2172 corresponding with the reading ID label 630, a pressure value 642 of 225.0 corresponding with the pressure label 640, a temperature value 652 of 84.6 corresponding with the temperature label 650, and a humidity value 662 of 69.03 corresponding with the humidity label 660. Additional rows may be included corresponding with data and information associated with other readings. The readings may optionally be listed in serial order, with the most recent readings being listed in the first row.

The illustrative interface may additionally include a navigation section 610, featuring links to this and other interface pages. The links may include an overview link 512, detail link 614, settings link 616, and graph link 618. Skilled artisans will appreciate that additional links may be includable for other pages or views providable by the interface.

Figure 7:
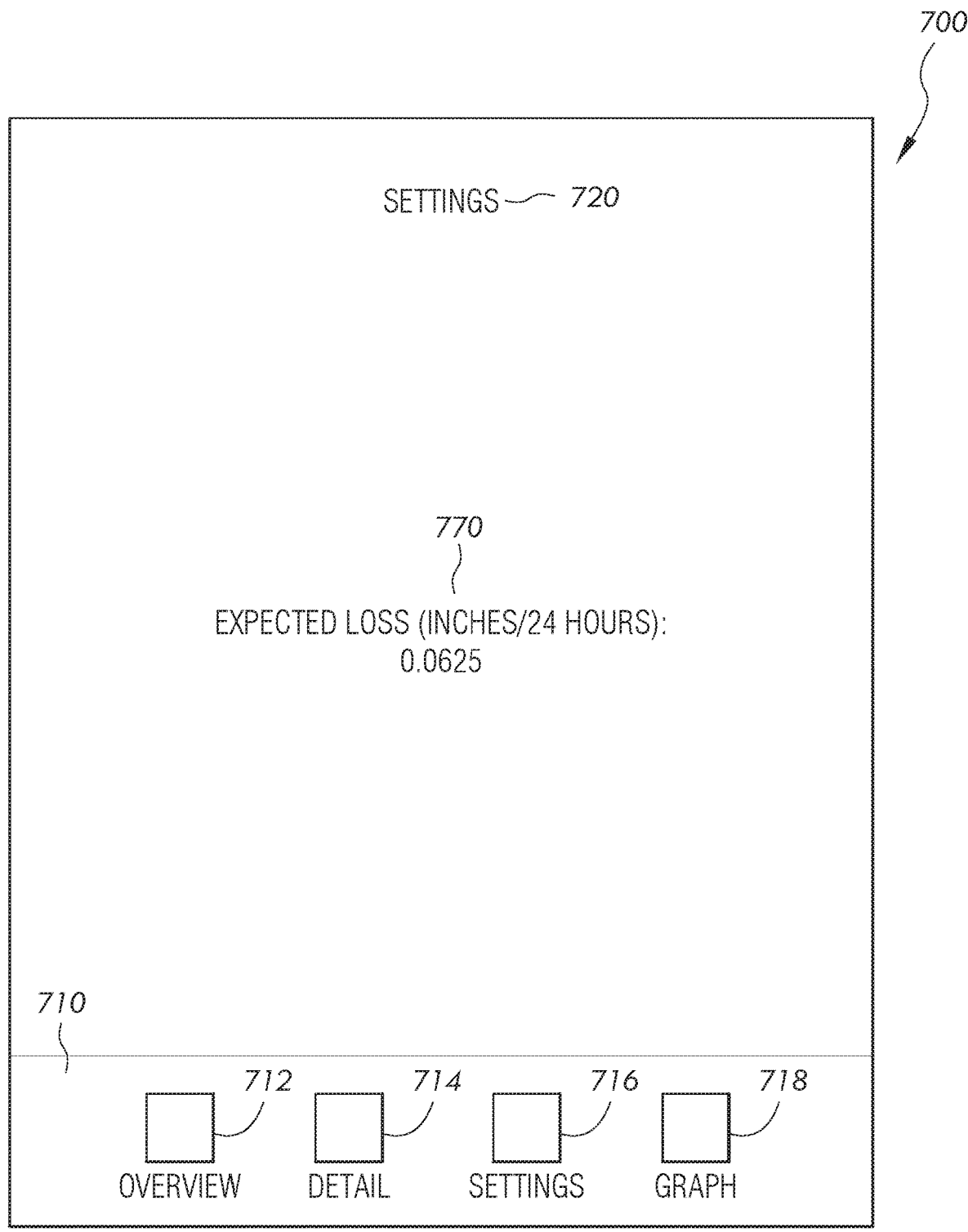
FIG. 7 is a diagram view of an illustrative interface page displaying settings, according to an embodiment of this disclosure.

Referring now to diagram 700 of FIG. 7, an illustrative interface page displaying settings will now be discussed, according to an embodiment of this disclosure. The settings page may include a title section 720, which may clearly identify the page as providing a customization of settings for expected data and information. An illustrative setting 770 is provided wherein a user may define an expected loss of fluid in a reservoir. An alert may be configured for if an anomaly is detected or if the condition of the reservoir is otherwise detected outside of the expected parameters.

The illustrative interface may additionally include a navigation section 710, featuring links to this and other interface pages. The links may include an overview link 712, detail link 714, settings link 716, and graph link 718. Skilled artisans will appreciate that additional links may be includable for other pages or views providable by the interface.

Figure 8:
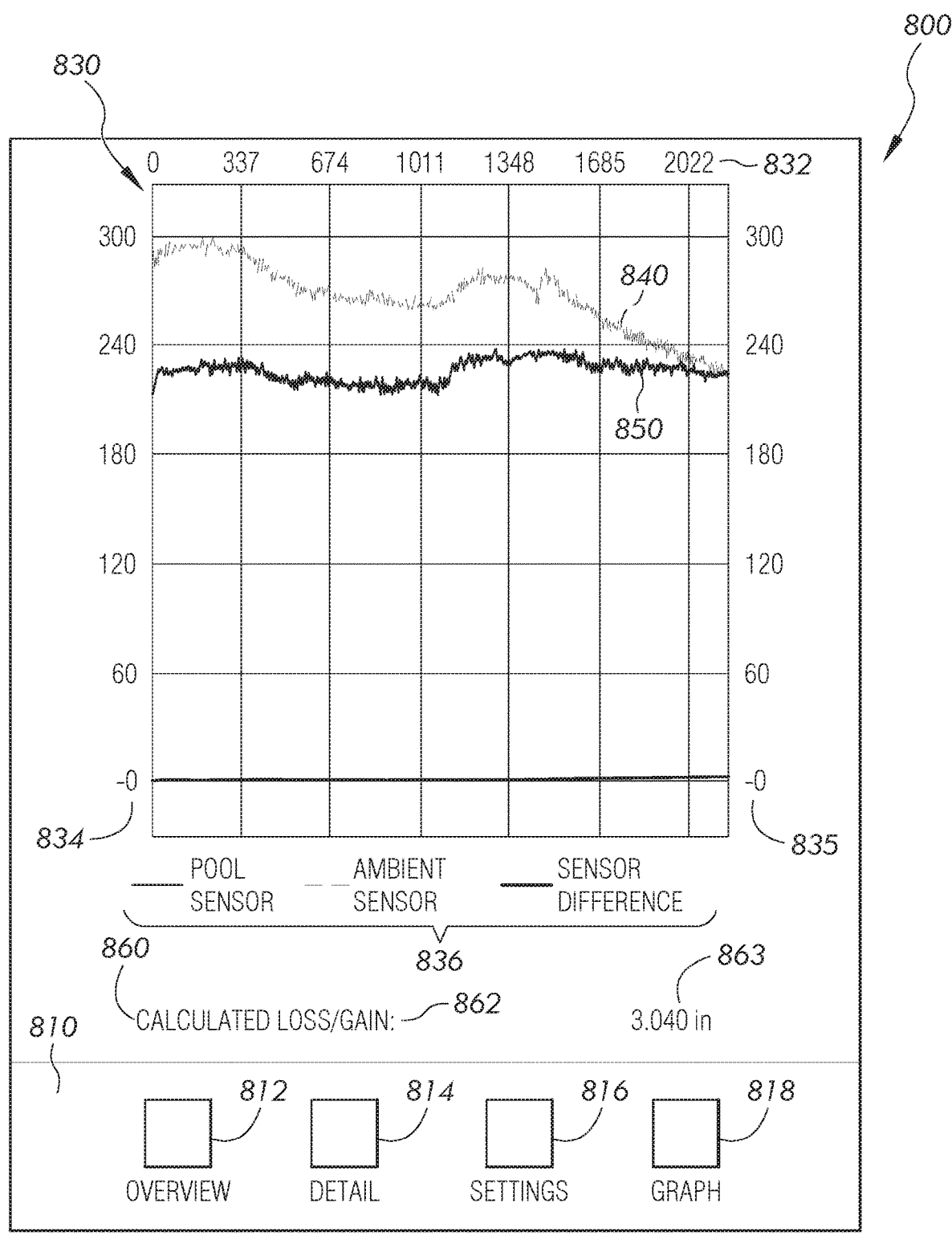
FIG. 8 is a diagram view of an illustrative interface page displaying a graph, according to an embodiment of this disclosure.

Referring now to diagram 800 of FIG. 8, an illustrative interface page featuring graphs will now be discussed, according to an embodiment of this disclosure. The graph page may include a graph 830 displaying a visual representation of data and information relating to the environment. The graph 830 may include a first axis label 832 and a second axis label 834. For example, the first axis label 832 may relate to the reading ID and the second axis label may relate to a sensed pressure level. In some embodiments, the graph may include additional labels for an axis, such as an alternative second axis label 835. A graph key 836 may be provided to help a user understand the information provided by the graph 830.

Multiple data sets may be included by the graph to display data or information from multiple sources. For example, an ambient sensor graph line 840 and a pool sensor graph line 850 may be provided for a user to quickly visualize the relationship between data detected by the various sensors. A calculated information section 860 may be provided including a calculated information label 862 and corresponding calculated information value 863.

The illustrative interface may additionally include a navigation section 810, featuring links to this and other interface pages. The links may include an overview link 812, detail link 814, settings link 816, and graph link 818. Skilled artisans will appreciate that additional links may be includable for other pages or views providable by the interface.

In operation, the fluid monitoring system may facilitate monitoring and control of a reservoir, such as a swimming pool, to detect leaks and other conditions. The fluid monitoring system may additionally facilitate monitoring conditions of fluid usage for a household. Those of skill in the art will appreciate that the following methods are provided to illustrate an embodiment of the disclosure, and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

In one example, pressure sensors connected to the sensor component may measure barometric and submerged pressure levels over time. The pressure level information may be communicated by the sensor component to an analytic component via a network. The analytic component may analyze the pressure information and detect patterns that a difference in pressure is changing over time, which may indicate a leak. The analytic component may then send an alert to a user, which may be viewed by the interface. The analytic component and/or control component may also enable a pump to add water to the pool until a satisfactory water level is again detected. Flow of water due to the pump may also be monitored, additionally indicating leak conditions. Further operations may be provided using alternative sensors and aspects of the system.

A method may be provided to detecting and modifying conditions relating to fluid flow. Those of skill in the art will appreciate that the following methods are provided to illustrate an embodiment of the disclosure, and should not be viewed as limiting the disclosure to only those methods or aspects. Skilled artisans will appreciate additional methods within the scope and spirit of the disclosure for performing the operations provided by the examples below after having the benefit of this disclosure. Such additional methods are intended to be included by this disclosure.

Figure 9:
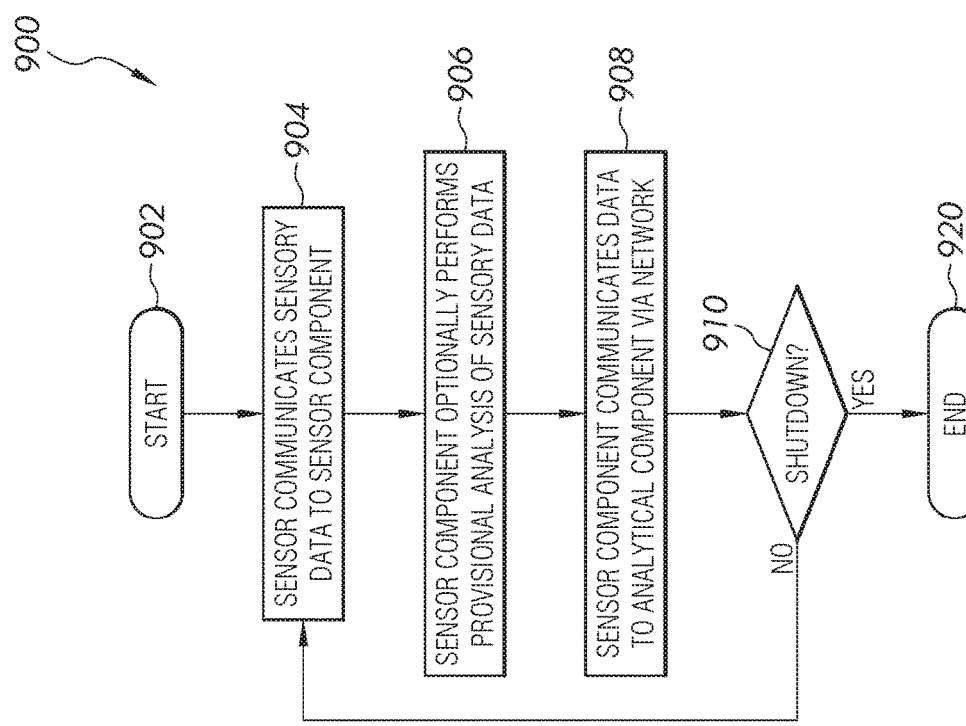
FIG. 9 is a flowchart view of a sensor detection and preliminary analysis operation, according to an embodiment of this disclosure.

Referring now to flowchart 900 of FIG. 9, an illustrative method for a sensor detection and preliminary analysis operation will be described, without limitation. Starting with block 902, the operation may begin by the sensor communicating sensory data to the sensor component (block 904). The sensor component may optionally perform a provisional analysis of the sensory data (block 906). The sensor component may additionally communicate data to the analytic component via a network (block 908).

The sensor component may determine if a shutdown instruction has been received (block 910). If it is determined at block 910 that a shutdown instruction has not been received, the sensor component may continue to receive data from the connected sensors at block 904. If it is determined at block 910 that a shutdown instruction has been received, the operation may terminate at block 920.

Figure 10:
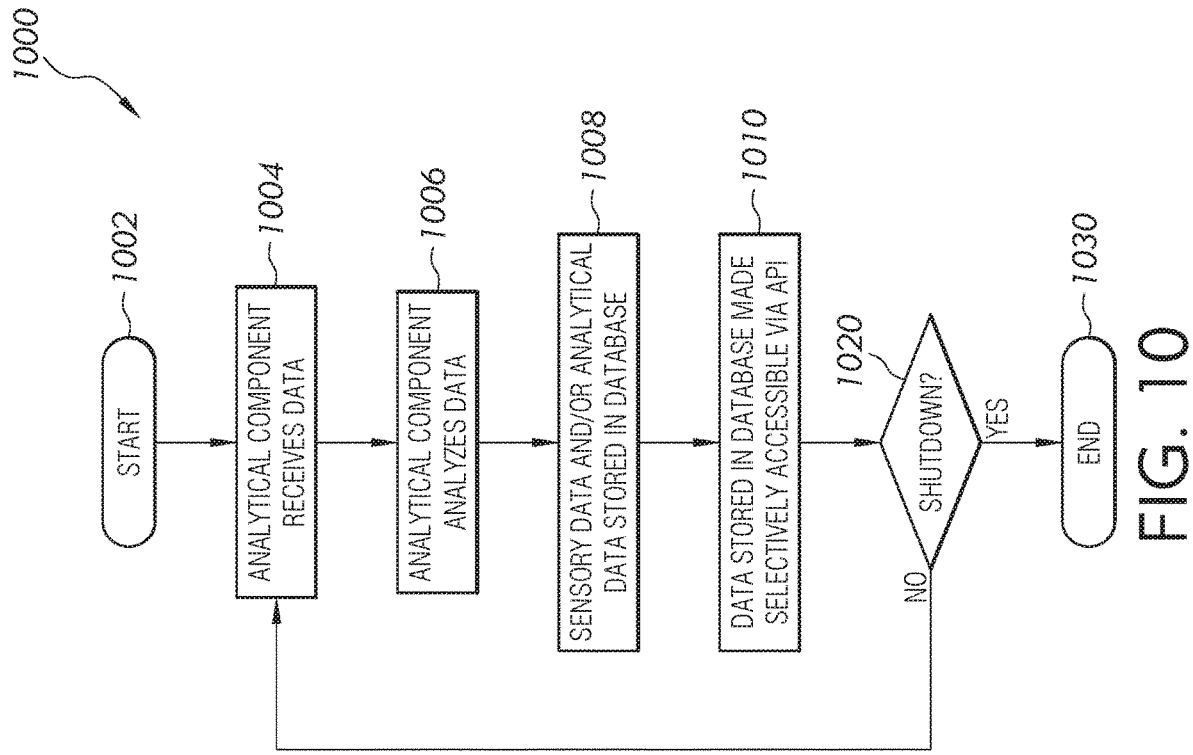
FIG. 10 is a flowchart view of a remote analysis operation, according to an embodiment of this disclosure.

Referring now to flowchart 1000 of FIG. 10, an illustrative method for a remote analysis operation will be described, without limitation. Starting with block 1002, the operation may begin by the analytic component receiving data, such as from the sensor component over a network (block 1004). The analytic component may analyze the data (block 1006). Sensory data and/or data derived by the analytic component may be stored in a connected database (block 1008). The data stored in the database may be made selectively accessible via an API (block 1010).

The analytic component may determine if a shutdown instruction has been received (block 1020). If it is determined at block 1020 that a shutdown instruction has not been received, the analytic component may continue to receive data from the sensor component at block 1004. If it is determined at block 1020 that a shutdown instruction has been received, the operation may terminate at block 1030.

Figure 11:
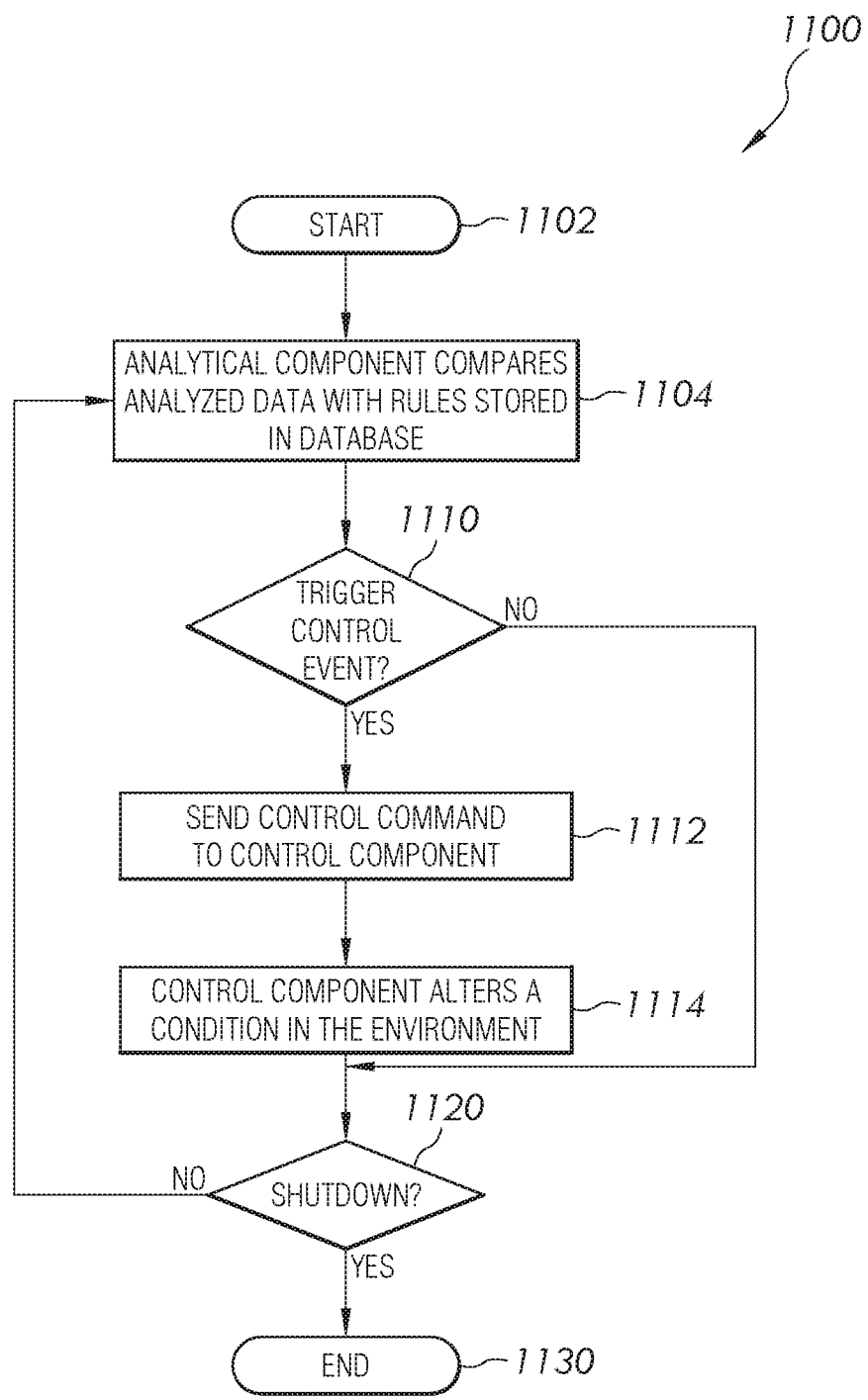
FIG. 11 is a flowchart view of a comparison of rules and analyzed data to optionally control a condition of the environment, according to an embodiment of this disclosure.

Referring now to flowchart 1100 of FIG. 11, an illustrative method for a comparison of rules and analyzed data to optionally control a condition of the environment will be described, without limitation. Starting with block 1102, the operation may begin by the analytic component comparing the analyzed data with rules stored in the database (block 1104). The analytic component may determine if the comparison triggers a control event (block 1110). If no control event is triggered at block 1110, the analytic component may continue to the operation of block 1120 and determine if a shutdown command has been received. If no shutdown command has been received at block 1120, the analytic component may continue to receive and analyze data from the sensor component and/or database as provided in block 1104. If a shutdown command has been received at block 1120, the operation may terminate at block 1130.

If a comparison of the analyzed data with the rules triggers a control event at block 1110, the analytic component may send a control command to the connected control component (block 1112). The connection between the analytic component and the control component may be maintained over a network. The control component may receive the command and alter a condition in the reservoir and/or environment (block 1114). Examples of alterable conditions may include water flow, chemical distribution, illumination, heating, and other conditions that would be appreciated by a person of skill in the art. The analytic component may continue to the operation of block 1120 and determine if a shutdown command has been received. If no shutdown command has been received at block 1120, the analytic component may continue to receive and analyze data from the sensor component and/or database as provided in block 1104. If a shutdown command has been received at block 1120, the operation may terminate at block 1130.

Figure 12:
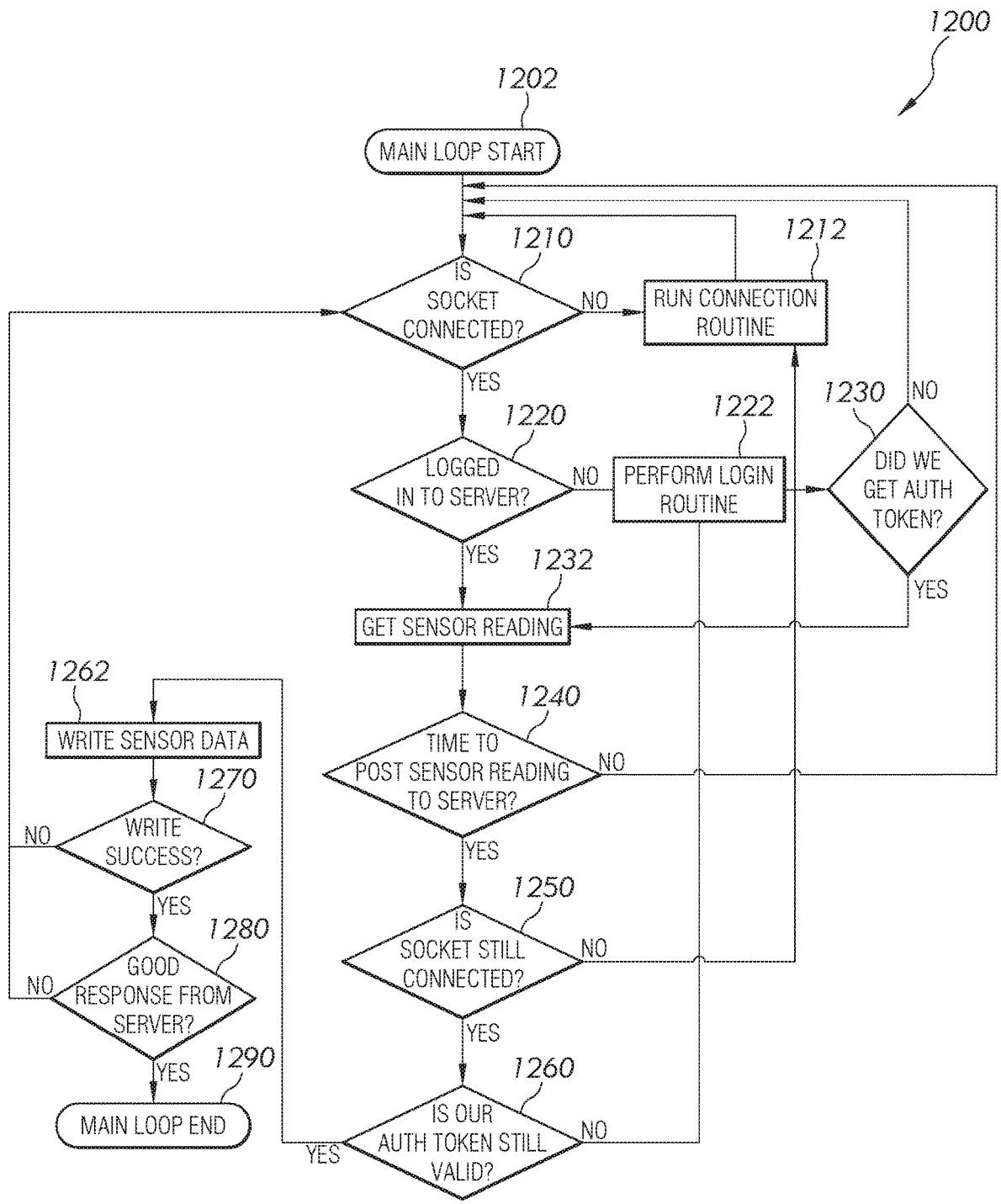
FIG. 12 is a flowchart view of a network communication performable by the system, according to an embodiment of this disclosure.

Referring now to flowchart 1200 of FIG. 12, an illustrative method for a network communication performable by components included by this disclosure will be described, without limitation. Starting with block 1202, the operation may begin by determining if a socket is connected (block 1210). In one example, this determination may include detecting a TCP socket connection between a sensor component and an analytic component communicatively connected via a network. If it is determined that the socket is not connected at block 1210, the operation may run a connection routine (block 1212). The connection routine may facilitate opening the communication socket to allow data and other information to be exchanged over a network. After the connection routine is performed at block 1212, the operation may again determine if a socket is connected at block 1210.

If it is determined at block 1210 that a socket is connected, the operation may determine if the connecting component is logged into the network connected component (block 1220). For example, the sensor component installed locally at a reservoir or household may attempt to log into a network-connected server on which the analytic component is operated. If a deficient login is determined at block 1220, the operation may perform a login routine to authorize communication between the components (block 1222).

After the login routine is performed at block 1222, the operation may determine whether an authorization token was received (block 1230). If it is determined at block 1230 that no authorization token was received, the operation may return to block 1210 and again attempt to establish a socket connection. If it is determined the connecting component is logged into the system at block 1220 or that an authorization token is received at block 1230, the operation may continue to get sensor readings (block 1232).

After the sensor reading is received at block 1232, the operation may determine whether to post the sensor reading to the server (block 1240). If it is determined at block 1240 that it is not time to post the sensor reading to the server, the operation may return to block 1210 and again attempt to establish a socket connection. If it is determined at block 1240 that it is time to post a sensor reading to the server, the operation may confirm whether the socket is still connected (block 1250).

If it is determined at block 1250 that the socket is no longer connected, the operation may return to block 1212 and perform a connection routine. If it is determined at block 1250 that the socket is still connected, the operation may confirm whether the authorization token is still valid (block 1260). If it is determined at block 1260 that the authorization token is no longer valid, the operation may return to block 1222 and perform a login routine. If it is determined at block 1260 that the authorization token remains valid, the operation may write sensor data to the network (block 1262). The sensor data may be provided to the analytic component, database, or other component connected via the network.

After writing the sensor data at block 1262, the operation may confirm whether the write was successful. If it is determined at block 1270 that the write was unsuccessful, the operation may return to block 1210 and again determine whether the socket is connected. If it is determined at block 1270 that the write was successful, the operation may next determine if a good response was received from the server (1280). If it is determined at block 1280 that a good response was not received from the server, the operation may return to block 1210 and again determine whether the socket is connected. If it is determined at block 1280 that a good response was received from the server, the operation may terminate at block 1290.

In an additional embodiment, an alarm element may be included to provide a detectable alert upon the occurrence of a condition. The alarm element may be operable on a computerized device through which aspects of the interface may be viewed. Alternatively, the alarm element may be operable on an independent device, which may be installed near the reservoir or pool being monitored.

The alarm element may create an audible, visual, or otherwise sensory perceptible indication upon the detection of a condition. For example, the alarm element may determine whether an abnormal level of pressure variation is detected in the reservoir, which may indicate a child, person, pet, or other body has likely fallen into the reservoir. If it is determined that the abnormal condition is present, the alarm element may cause an audible sound to be heard by a person maintaining or supervising the pool. In additional examples, without limitation, an alarm may be provided to a user upon detection of leak conditions, near freezing temperatures, undesirable chemical levels, or other definable conditions.

While various aspects have been described in the above disclosure, the description of this disclosure is intended to illustrate and not limit the scope of the invention. The invention is defined by the scope of the appended claims and not the illustrations and examples provided in the above disclosure. Skilled artisans will appreciate additional aspects of the invention, which may be realized in alternative embodiments, after having the benefit of the above disclosure. Other aspects, advantages, embodiments, and modifications are within the scope of the following claims.

What is claimed is:

1. A system for detecting a leak in a swimming pool, the system comprising:
    a water reservoir defining the swimming pool;
    a control component configured to manage provision of water to the water reservoir;
    a sensor component connected to sensors comprising at least a first sensor and a second sensor disposed in the water reservoir;
    an analytic component communicatively connected to the sensor component via a network to receive and analyze data from the sensor component to monitor a water level in the water reservoir;
    a smart phone communicatively connected to the analytic component to receive information associated with the water level in the water reservoir; and
    a pool light disposed within the water reservoir, the pool light comprising a light housing submerged in the water reservoir and including the first sensor disposed in a lower portion of the light housing and the second sensor disposed in a higher portion of the light housing,
    wherein the first and second sensors are pressure sensors configured to provide some of the data as corresponding pressure readings to the sensor component to enable determination of the water level, and
    wherein the analytic component is configured to determine an existence of the leak based on monitoring the water level over a period of time.

2. The system of claim 1, wherein the analytic component only performs calculations to determine the existence of the leak responsive to a request for information from the smart phone in order to limit calculation cycles for the analytic component.

3. The system of claim 1, wherein at least a portion of the control component is also installed in the light housing.

4. The system of claim 1, wherein the network is a wireless communication network.

5. The system of claim 1, wherein the control component is configured to add water to the water reservoir to maintain the water level in an operating range, and
    wherein the analytic component is configured to determine the existence of the leak based at least in part on an amount of water added to the water reservoir over the period of time.

6. The system of claim 1, wherein the sensors further include a third sensor and a fourth sensor, and
    wherein the third and fourth sensors are submerged in a household point of water usage.

7. The system of claim 6, wherein the household point of water usage is a toilet or reservoir inside a house.

8. The system of claim 1, wherein the smart phone is configured to interface with the analytic component via an application programming interface (API), and
wherein the API controls access privileges to the data.

9. The system of claim 1, wherein the smart phone is configured to interface with the analytic component via an application programming interface (API), and
wherein the API controls generation of alerts generated based on changes in water level associated with the existence of the leak.

10. The system of claim 1, wherein the smart phone is configured to interface with the analytic component via an application programming interface (API), and
wherein the API controls generation of alerts generated based on changes in pressure in the water reservoir that are not associated with the existence of the leak.

11. A system for detecting a leak in a swimming pool, the system comprising:
a water reservoir defining the swimming pool;
a control component configured to manage provision of water to the water reservoir via a fill tube;
a sensor component connected to sensors comprising at least a first sensor and a second sensor disposed in the water reservoir;
an analytic component communicatively connected to the sensor component via a network to receive and analyze data from the sensor component to monitor a water level in the water reservoir; and
a smart phone communicatively connected to the analytic component to receive information associated with the water level in the water reservoir,
wherein the first sensor is disposed in a lower portion of the fill tube of the control component and the second sensor disposed in a higher portion of the fill tube of the control component,
wherein the first and second sensors are pressure sensors configured to provide some of the data as corresponding pressure readings to the sensor component to enable determination of the water level, and
wherein the analytic component is configured to determine an existence of the leak based on monitoring the water level over a period of time.

12. The system of claim 11, wherein the control component is configured to add water to the water reservoir to maintain the water level in an operating range, and
wherein the analytic component is configured to determine the existence of the leak based at least in part on an amount of water added to the water reservoir over the period of time.

13. The system of claim 11, wherein the smart phone is configured to interface with the analytic component via an application programming interface (API), and
wherein the API controls access privileges to the data.

14. The system of claim 11, wherein the smart phone is configured to interface with the analytic component via an application programming interface (API), and
wherein the API controls generation of alerts generated based on changes in water level associated with the existence of the leak.

15. The system of claim 11, wherein the smart phone is configured to interface with the analytic component via an application programming interface (API), and
wherein the API controls generation of alerts generated based on changes in pressure in the water reservoir that are not associated with the existence of the leak.

16. A system for detecting a leak in a swimming pool or household environment, the system comprising:
a water reservoir defining the swimming pool;
a control component configured to manage provision of water to the water reservoir;
a sensor component connected to sensors comprising at least a first sensor and a second sensor disposed in the water reservoir and comprising a third sensor and a fourth sensor submerged in a household point of water usage;
an analytic component communicatively connected to the sensor component via a network to receive and analyze data from the sensor component to monitor a water level in the water reservoir and in the household point of water usage; and
a computing device communicatively connected to the analytic component to receive information associated with the water level in the water reservoir and in the household point of water usage,
wherein the first and second sensors are pressure sensors configured to provide some of the data as corresponding pressure readings to the sensor component to enable determination of the water level in the water reservoir, and the third and fourth sensors are pressure sensors configured to provide some of the data as corresponding pressure readings to the sensor component to enable determination of the water level in the household point of water usage, and
wherein the analytic component is configured to determine an existence of the leak based on monitoring the water level over a period of time.

17. The system of claim 16, wherein the household point of water usage is a toilet or reservoir inside a house.

18. The system of claim 16, wherein the control component is configured to add water to the water reservoir or the household point of water usage to maintain the water level in an operating range, and
wherein the analytic component is configured to determine the existence of the leak based at least in part on an amount of water added to the water reservoir or the household point of water usage over the period of time.

19. The system of claim 16, wherein the smart phone is configured to interface with the analytic component via an application programming interface (API), and
wherein the API controls generation of alerts generated based on changes in water level associated with the existence of the leak.

20. The system of claim 16, wherein the smart phone is configured to interface with the analytic component via an application programming interface (API), and
wherein the API controls generation of alerts generated based on changes in pressure in the water reservoir that are not associated with the existence of the leak.

* * * * *